(12) United States Patent
Kunz et al.

(10) Patent No.: US 8,425,170 B2
(45) Date of Patent: Apr. 23, 2013

(54) BONDED ADHESION OF WIRE-SHAPED INDIVIDUAL ELEMENTS BY MEANS OF A TWO-LAYER ACRYLATE RESIN-BASED SYSTEM

(75) Inventors: Andreas Kunz, Remscheid (DE); Juergen Stodt, Neuss (DE); Holger Endres, Neuss (DE); Wolfgang Schneider, Langenfeld (DE); Stefan Bonekamp, Duesseldorf (DE); Patrick Podwoiski, Erkrath (DE)

(73) Assignee: Henkel AG & Co. KGAA, Duesseldorf (DE)

( * ) Notice: Subject to any disclaimer, the term of this patent is extended or adjusted under 35 U.S.C. 154(b) by 46 days.

(21) Appl. No.: 13/087,704

(22) Filed: Apr. 15, 2011

(65) Prior Publication Data

US 2011/0194914 A1 Aug. 11, 2011

Related U.S. Application Data

(63) Continuation of application No. PCT/EP2009/061248, filed on Sep. 1, 2009.

(30) Foreign Application Priority Data

Oct. 21, 2008 (DE) .......................... 10 2008 052 619

(51) Int. Cl.
 *F16B 15/08* (2006.01)
(52) U.S. Cl.
 USPC ............................. 411/443; 411/442; 411/444
(58) Field of Classification Search .................. 411/439, 411/442–444
 See application file for complete search history.

(56) References Cited

U.S. PATENT DOCUMENTS

| | | | | |
|---|---|---|---|---|
| 3,471,008 A * | 10/1969 | Cast et al. | | 206/344 |
| 3,736,198 A * | 5/1973 | Leistner | | 156/65 |
| 3,878,663 A * | 4/1975 | Shelton | | 53/399 |
| 3,966,042 A * | 6/1976 | Shelton et al. | | 206/344 |
| 4,018,333 A * | 4/1977 | Blackwood | | 206/343 |
| 4,162,728 A * | 7/1979 | Uzumcu et al. | | 206/345 |
| 4,343,579 A * | 8/1982 | Shelton et al. | | 411/442 |
| 4,664,733 A * | 5/1987 | Masago | | 156/212 |
| 5,149,237 A * | 9/1992 | Gabriel et al. | | 411/446 |
| 5,733,085 A * | 3/1998 | Shida et al. | | 411/442 |
| 7,064,163 B2 * | 6/2006 | Shida | | 525/70 |
| 8,047,752 B2 * | 11/2011 | Shida et al. | | 411/443 |
| 2008/0317563 A1 | 12/2008 | Shida et al. | | |

FOREIGN PATENT DOCUMENTS

| | | |
|---|---|---|
| DE | 19545571 A1 | 6/1997 |
| GB | 1515774 A | 6/1978 |
| WO | 9414553 A1 | 7/1994 |

* cited by examiner

*Primary Examiner* — Roberta Delisle
(74) *Attorney, Agent, or Firm* — Jane E. Gennaro

(57) ABSTRACT

The present invention relates to a method for the bonded adhesion, or connection, of a plurality of wire-shaped individual elements into an arrangement, particularly into a wire band, wherein the adjacent individual elements have predetermined breaking points allowing for the mechanical removal of the individual elements. The bonded adhesion is brought about according to the invention utilizing a two-layer system on the basis of acrylate resins consisting of an inner coating (A) and of an outer coating (B), wherein the inner coating (A) has a lower hardness, than the outer coating. In a further aspect the invention also comprises arranging a plurality of wire-shaped individual elements through such a bonded connection, particularly a wire band.

5 Claims, 2 Drawing Sheets

BONDED ADHESION OF WIRE-SHAPED INDIVIDUAL ELEMENTS BY MEANS OF A TWO-LAYER ACRYLATE RESIN-BASED SYSTEM

CROSS-REFERENCE TO RELATED APPLICATIONS

This application is a continuation of International Patent Application No. PCT/EP2009/061248 filed Sep. 1, 2009, which claims priority to German Patent Application No. 10 2008 052 619.3 filed Oct. 21, 2008, the contents of both of which are incorporated herein by reference.

BACKGROUND OF THE INVENTION

The adhesive bonding of wire-shaped individual elements for manufacturing stacks of clips is a process known in the prior art. The diameters of the individual elements or individual wires of the stack of clips vary depending on the use and type of fixation by means of the clips. For extra-fine wire clips used in offices, a diameter of the individual wires is typically not more than 0.6 mm, whereas fine wire clips with a diameter of not more than 1 mm represent the commonest staples with the largest field of use. On the other hand, industrial clips generally have diameters of more than 1 mm, wherein wire clips with a diameter of more than 5 mm scarcely have an industrial significance any more.

Metal staples have by far the greatest technical importance and are generally manufactured by two techniques, viz. firstly by means of a wire drawing machine, through which a wire passes, the individual staples are cut off and their ends are sharpened, and then the individual staples are packed onto an essentially U-shaped rack. Solvent-containing adhesive paint is usually applied on the top and side surfaces of the individual adjacent staples on the rack of touching staples. Excess adhesive is wiped off by means of a knife or a wiper and the solvent driven off by heating the staples in an oven or for example by electrically heating the rack. In a second technique of the prior art, a number of wires, for example several hundred wires, are laid side by side to form a flat ribbon and the ribbon is coated underneath and/or on top with paint ("linear band process"). After drying, the ribbon of wires is rolled up and the rolled up ribbon of wires is then cut up and bent to form staple strips.

A solvent-based paint-like substance is usually used in both processes or in their modifications, wherein the viscosity and the solids content need to be carefully adjusted. This causes a simply limited manufacturing rate, because the solvent must first of all be completely removed from the adhesive coating by a time-intensive heat treatment. A manufacturing process of this type for stacks of clips with solvent-containing adhesive formulations is disclosed in DE 19545571.

A solvent-free process with UV curable adhesive bonding of individual wires arranged in parallel in a linear band process for manufacturing rolled up ribbons of wires is described in WO 94/14553.

DE 2622758 likewise teaches an improved process for manufacturing stacks of metallic clips in which an adhesive in the form of a radiation-curable, solvent-free, polymer mixture is applied onto a number of individual metal clips or wires arranged side by side. In particular, synthetic resins based on acrylate-modified polyurethanes, polyethers, polyesters and epoxides are suitable paint systems that cure under UV radiation in the presence of multifunctional crosslinking acrylates and monofunctional acrylate diluents. However, DE 2622758 teaches the application of a single layer system, such that the possibilities for regulating the integrity of the adhesively bonded clip stack remain limited. "Integrity" is understood by the person skilled in the art of producing clip stacks to mean the mechanical stability of the adhesively bonded stack, concomitant with sufficient flexibility of the composite for rolling up the ribbon of wires onto a roller in the linear band process.

Accordingly, the paint system has to be adapted such that the polymeric coating is neither too soft, which would result in a high attrition of the pressing jaws as the ribbon of wires is being shaped, thereby rapidly leading to a shutdown of the production process, nor too hard, which would cause the staples to be released too easily at their predetermined breakage point which can lead to claims from the end-user.

SUMMARY OF THE INVENTION

The present invention relates to a process for cohesive adhesive bonding or connecting a plurality of wire-shaped individual elements to form an arrangement, in particular to a ribbon of wires, wherein the adjacent individual elements have predetermined breakage points that allow the individual elements to be mechanically removed. The cohesive connection is inventively brought about with a two-layer system based on acrylate resins consisting of an inner coating (A) and an outer coating (B), wherein the inner coating (A) has a lower hardness than the outer. In another aspect the invention also includes the arrangement of a plurality of wire-shaped individual elements through such a cohesive connection, in particular a ribbon of wires.

LIST OF REFERENCE NUMERALS

Figure 1:
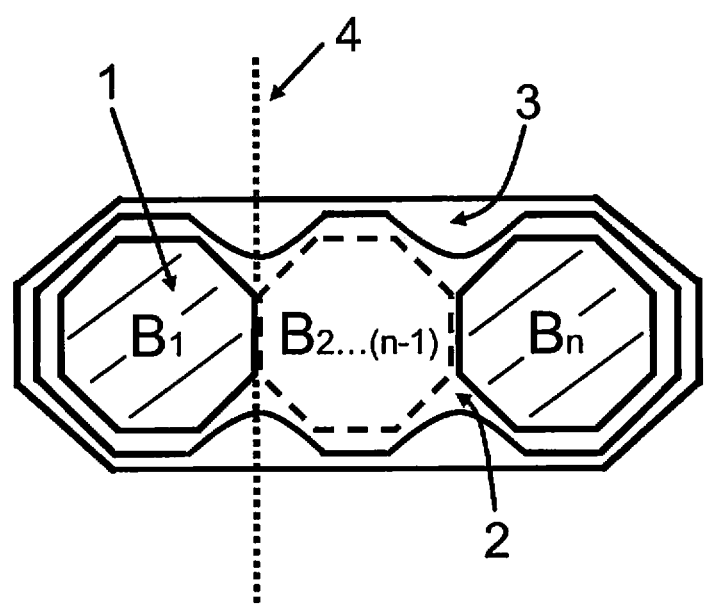
In FIG. 1 is shown a schematic illustration of an adhesively bonded ribbon of wires manufactured in the linear band process according to a preferred embodiment of the inventive arrangement of a plurality Bn of wire-shaped individual elements 1, wherein the wire-shaped individual elements 1 are formed with an octagonal cross section and which are arranged in a plane parallel to a longitudinal axis (not shown) of the wire-shaped individual elements 1, wherein the longitudinal axes of the wire-shaped individual elements 1 stand perpendicular to the plane of the Figure. The cohesive connection of the individual elements 1 is constructed with a two-layer system consisting of a first coating 2 and a second coating 3 and based on acrylate resins having different hardness, wherein the two-layer system completely surrounds the pictured ribbon of wires. A predetermined breakage surface 4 of the cohesive connection between the adjacent wire-shaped individual elements 1 runs orthogonally to the plane of the ribbon of wires and is the mirror plane of the adjacent individual element 1.
Figure 2:
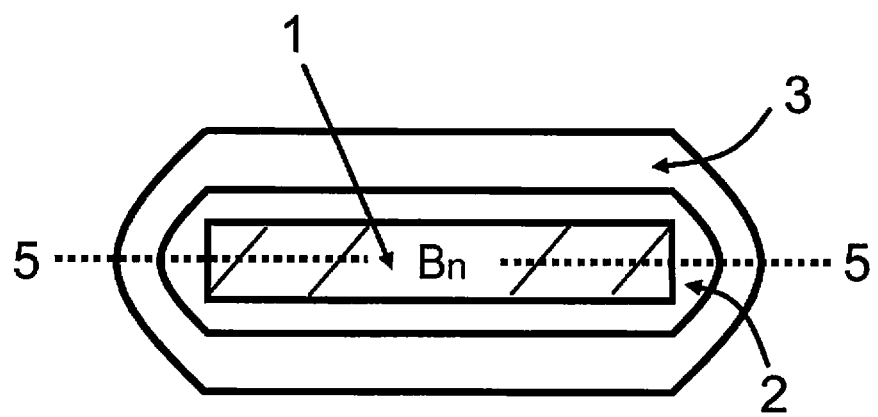
In FIG. 2 is illustrated a schematic drawing of the top view onto the predetermined breakage surface 4 along a longitudinal axis 5 of the wire-shaped individual element 1 of FIG. 1. The two-layer system, consisting of a first coating 2 and a second coating 3 and based on acrylate resins of different hardness, completely surrounds the arrangement according to the invention, the adhesively bonded ribbon of wires, as is clearly discernable by juxtaposing the two Figures.

1: Wire-shaped individual element
2: Coating (A) based on an acrylate resin
3: Coating (B) based on an acrylate resin 4: Predetermined breakage area
5: Longitudinal axis of the wire-shaped individual element

DETAILED DESCRIPTION OF THE INVENTION

The object of the present invention now consists in cohesively connecting or adhesively bonding an arrangement of wire-shaped individual elements, in particular of individual wires, as a magazine or stack of fastening elements, such that on the one hand predetermined breakage points are made between adjacent individual elements, on the other hand the total arrangement of a plurality of the individual elements, in particular the ribbon of wires, possesses sufficient stability and flexibility for handling, such that the arrangement, in particular the ribbon of wires, can be subsequently shaped. An arrangement of this type, in particular a ribbon of wires of this type, is intended to be produced, in comparison with the prior art, in a rational and environmentally sound process, in which the use of solvent-containing adhesive compositions can be almost completely avoided.

This object is achieved by a process for manufacturing an arrangement from a plurality of wire-shaped individual elements, in which each individual element has essentially the same shape and in which two adjacent individual elements are each connected together through a cohesive connection that is formed such that a predetermined breakage area is created for separating the individual elements from one another, wherein the process includes at least the following process steps:

i. arranging a plurality of wire-shaped individual elements in a plane parallel side by side or parallel to the plane defined by the individual elements and in contact with one another,
ii. coating this arrangement on one or both sides with a first composition that comprises acrylate group-containing, radiation curable polymers as well as internal or external plasticizers,
iii. curing the coating (A) that was deposited in step b) by radiation, preferably by UV radiation,
iv. coating a second composition onto one or both sides of the first composition that was cured in step c), said second composition comprising radiation curable acrylate group-containing polymers
and is formulated in such a way that said polymers, after curing, are harder than the cured first composition,
v. curing the coating (B) that was deposited in step b) by radiation, preferably by UV radiation.

The wire-shaped individual elements concern wires or individual elements formed from wire, wherein the shaped wire-shaped individual element as a whole lies in a plane. In the context of the invention, wire-shaped individual elements are understood to mean not only cylindrical wires or individual elements formed from these, but also arrangements of rolled wires with a non-cylindrical cross section. Such rolled wires result, for example, from the mechanical arrangement of individual wires by means of straightening rollers and compression rollers to tapes in the staple production in the linear band process, with the aim of adhesively bonding the flat rolled wire-shaped individual elements onto the arrangement.

"The shape" is inventively understood to mean the exact three-dimensional shape of the individual element. This can be based on a defined design of the wire itself or on the shaping of the wire undertaken in a specific manner. In the context of the present invention, a preferred shape is the drawn and rolled wire or the wire that is shaped into a U-shaped clip. Wire-shaped individual elements are further preferred with a maximum cross sectional width of the wire of not more than 5 mm, particularly preferably of not more than 2 mm, wherein a maximum cross sectional width of at least 0.2 mm is preferred.

In the context of the invention, a cohesive connection then exists when each wire-shaped individual element is connected with its adjacent wire-shaped individual element at least partially through a material bridge, wherein the material consists of organic polymers.

According to the inventive definition, the predetermined breakage area therefore lies in a plane that separates the adjacent wire-shaped individual elements from one another in a mirror-image arrangement. The predetermined breakage area therefore always runs through the cohesive connection between two adjacent wire-shaped individual elements.

For carrying out the process according to the invention, the person skilled in the art can firstly determine the hardness of the coatings (A) and (B) by means of standardized test methods on compositions applied in a defined wet thickness onto glass surfaces and then cured. It is also possible to test the hardness directly on the cohesive connection of the arrangement of the plurality of wire-shaped individual elements, but is experimentally unequally costlier.

The process according to the invention is suitable for use on surfaces of ferrous materials, steel and alloyed steel, light metals such as aluminum, magnesium, titanium, non-ferrous metals, such as copper, zinc, tin or precious metals, such as gold, silver, or their alloys. In this regard the surface of the wire-shaped individual elements can be ground, brush-finished, polished, electrochemically treated or electrochemically coated, e.g. galvanized, cadmium-plated, chromium-plated or nickel-plated. Metallized wire-shaped individual elements of plastic and wire-shaped plastics are also suitable.

The wire-shaped individual elements aligned or arranged in step i) are inventively provided in steps ii) and iii) with a first acrylate-based coating (A) that as the so called primary coating already produces a first cohesive connection between the individual elements. In this coating (A), according to the invention there are internal and/or external plasticizers that lend the cured polymeric material bridge the mechanical flexibility required for handling the arrangement of the individual elements. External plasticizers in the process according to the invention are substances with a boiling point above 250° C. and which are easily soluble in the polymer system. Preferred internal plasticizers are those that as a result of their functionality are capable of forming chemical bonds with the polymer backbone, such that this type of plasticizer cannot migrate due to physical processes out of the interior of the coating onto the surface or into intermediate layers which would result in unwanted changes in the hardness of the coating. In the context of the invention, preferred internal plasticizers are those that possess at least one unsaturated double bond and can therefore be bonded to the polymer backbone during the curing step or subsequent to it.

The respective compositions of steps ii) and iv) of the process according to the invention are preferably characterized in that both the first as well as the second composition each comprise less than 2 wt. %, particularly less than 0.5 wt. % of components that evaporate out of the coating during curing. This succeeds in that a fraction of liquid radiation-hardening acrylate-containing compounds is preferably incorporated into the compositions, and as a so called reactive diluent fraction solubilizes solid ingredients, for example the acrylate-modified polymers and at the same time allows the viscosity of the relevant composition to be adjusted over broad ranges.

The first radiation-curable composition of step ii) of the process according to the invention is preferably chosen such that for a cured free film of this first composition with a thickness of 1 mm and a length and width of 1 cm, there results a maximum elongation at break of more than 5 mm, preferably of more than 10 mm for the cured film.

In contrast, the second radiation-curable composition of step ii) of the process according to the invention is preferably chosen such that for a cured, free film of this first composition with a thickness of 1 mm and a length and width of 1 cm, there results a maximum elongation at break of not more than 5 mm for the cured film.

The free film of both of the compositions of steps ii) and iv) which comprise polymers with acrylate groups can be experimentally determined by irradiating a composition applied in a corresponding wet thickness onto a glass surface because the cured compositions (A) and (B) do not adhere to the glass surfaces. By determining the formulation of the compositions as a function of the abovementioned experimental variables that correlate with the hardness of the coatings (A) and (B), one obtains an optimal integrity, i.e. stability and flexibility, of the arrangement of wire-shaped individual elements that are cohesively connected with one another, for their use as a magazine of individual wire-shaped fastening elements, especially for stacks of staples.

In addition, those first compositions are preferred that comprise an acid group-containing polymer; this because they provide an improved adhesion of the coating (A) to metallic surfaces and therefore also an improved cohesive connection of metallic wire-shaped individual elements of the arrangement. Moreover, the addition of acid group-containing polymers significantly improves the adhesion of the coating (A) to the coating (B). Acid group-containing (meth)acrylate compounds that comprise one, two or more (meth)acrylic groups and additional acidic functional groups are particularly preferred for the first composition in step ii) of the process according to the invention. The quantity of this constituent should again be between 0.1 and 20 wt. %, particularly preferably between 0.5 and 10 wt. %. Examples of such acidic functional groups are carboxylic groups, phosphoric acid or phosphonic acid groups, sulfonic acid groups as well as their derivatives, such as e.g. esters. Phosphoric acid groups are preferred, especially for a first composition according to step ii) of the process according to the invention.

The respective compositions in steps ii) and iv) of the process according to the invention preferably comprise radiation-curable polymeric compounds that contain unsaturated double bonds, such as for example polyester or polyether oligomers with pendant or terminal (meth)acrylate groups, or preferably (meth)acrylate-functional aliphatic, cycloaliphatic and/or aromatic epoxy compounds or polyurethane oligomers with reactive (meth)acrylate groups. These polymeric or oligomeric compounds should possess at least two functional unsaturated double bonds and in general have a molecular weight between 500 and 15 000. They are commercially available. The amount is 40 to 90, particularly 45 to 85 wt. %, wherein mixtures of several of these radiation curable polymeric or oligomeric compounds are also possible.

Furthermore, the respective compositions in steps ii) and iv) of the process according to the invention should preferably comprise at least one mono, di, tri or polyfunctional unsaturated low molecular weight (meth)acrylate, wherein individual compounds or mixtures may be present. Examples of such compounds are: optionally alkoxylated alkane diol- or alkane triol (meth)acrylates such as 1,3-butylene glycol di(meth)acrylate, 1,4-butane diol di(meth)acrylate, 1,6-hexane diol di(meth)acrylate, trialkylene glycol di(meth)acrylate, polyalkylene glycol di(meth)acrylate, tetraalkylene glycol di(meth)acrylate, neopentyl glycol di(meth)acrylate, glycerin alkoxy tri(meth)acrylate, alkoxylated neopentyl glycol di(meth)acrylate; (meth)acrylic epoxy compounds, such as Bisphenol-A-epoxy di(meth)acrylate; polyhydroxy (meth)acrylates such as pentaerythritol tri(meth)acrylate, trimethylolpropane tri(meth)acrylate, trisalkoxy-trimethylol propane tri(meth)acrylate, di-trimethylol-propane tetra(meth)acrylate, pentaerythritol tetra(meth)acrylate, tris-(2-hydroxyalkyl)-isocyanurate tri(meth)acrylate, dipentaerythritol tetra (meth)acrylate, dipentaerythritol penta(meth)acrylate, dipentaerythritol hexa(meth)acrylate, wherein alkylene means ethylene, propylene or butylene and alkoxy means ethoxy, 1,2- or 1,3-propoxy or 1,4-butoxy.

The following (meth)acrylates can be used for example as the monofunctional acrylate compounds: linear, branched or cyclic alkyl (meth)acrylates such as n-/iso-alkyl (meth)acrylate, cyclohexyl (meth)acrylate, 4-tert.-butylcyclohexyl (meth)acrylate, dihydrocyclopentadienyl (meth)acrylate, tetrahydrofurfuryl (meth)acrylate, isobornyl (meth)acrylate, allyl (meth)acrylate, mono(meth)acryloylalkyl phthalate, -succinate or -maleate; alkane diol mono(meth)acrylates, such as hydroxypropyl (meth)acrylate, polyalkylene glycol (meth)acrylate, monoalkoxytrialkylene glycol (meth)acrylate, 2,3-epoxypropyl (meth)acrylate; aromatic (meth)acrylates such as nonylphenol (meth)acrylate, 2-phenoxyalkyl (meth)acrylate; acrylamides such as N,N-di-alkyl (meth)acrylamide, N,N-dialkylaminoalkyl (meth)acrylamide. Moreover, vinyl ethers can also be employed to some extent, such as e.g. vinyl ethyl ether, vinyl propyl ether, vinyl isobutyl ether, vinyl dodecyl ether, butane diol 1,4-divinyl ether, diethylene glycol divinyl ether, hydroxybutyl vinyl ether. The monomeric mono, di, tri or polyfunctional unsaturated low molecular weight (meth)acrylate compounds can be present individually or as a mixture, wherein the total amount should be preferably between 5 to 60, especially between 10 to 55 wt. %.

Known preferred radical initiators can be employed as the photo initiators, such as for example 2-benzyl-dimethylamino-1-(4-morpholinophenyl)-butan-1-one, benzildimethyl ketal dimethoxyphenyl acetophenone, α-hydroxybenzyl phenyl ketone, 1-hydroxy-1-methylethyl phenyl ketone, oligo-2-hydroxy-2-methyl-1-(4-(1-methylvinyl)phenyl) propanone, benzophenone, methyl ortho-benzoyl benzoate, methyl benzoylformate, 2,2-diethoxyacetophenone, 2,2-di-sec. butoxyacetophenone, p-phenylbenzophenone, 2-isopropylthioxanthone, 2-methylanthraquinone, 2-ethylanthraquinone, 2-chloroanthraquinone, 1,2-benzanthraquinone, benzil, benzoin, benzoin methyl ether, benzoin isopropyl ether, α-phenylbenzoin, thioxanthone, diethylthioxanthone, 1,5-acetonaphthalene, 1-hydroxycyclohexyl phenyl ketone, ethyl p-dimethylaminobenzoate. They can be used singly or in a mixture or combined with additional radical initiators of the peroxide type or with amine accelerators.

In addition to the abovementioned constituents, the respective compositions in steps ii) and iv) of the process according to the invention can also comprise minor amounts of additives that advantageously affect, for example leveling properties, film formation or stability of the respective composition in step ii) or iv). Examples of these are leveling agents, such as fluorinated polysilicone glycols, silicone glycols, polyether polysiloxane copolymers. Known agents based on sterically hindered amino compounds can be employed as light stabilizers. As film forming agents, waxes can be added in order to achieve higher surface smoothness and to reduce the surface tack of the radiation cured compositions. The waxes are preferably dispersible and/or soluble in the component b) of the respective composition such that stable formulations with high storage stability and good film forming properties can be obtained. In order to prevent migration of the wax ingredients out of the coating, it is further preferred that the waxes are chemically functionalized such that they bond to the polymer backbone.

The respective composition of steps ii) and iv) in the process according to the invention can optionally further comprise colorants, optical brighteners and/or pigments as additives. Colorants are those based on organic colorants that are soluble in the respective composition. After the film has been cured, these form colored transparent coatings and together with the substrate surface can produce special visual effects. Optical brighteners are those compounds that absorb UV radiation and re-emit in the visible light spectrum; they are selected for example among the triazine derivatives. Pigments are understood to mean organic or inorganic colored or colorless pigment preparations, such as iron oxide pigments, titanium dioxide pigments, quinacridone or phthalocyanine pigments. They must be homogenously dispersed in the coating agent. Here the particle size must be significantly less than the proposed layer thickness, preferably less than 1 µm. It can be advantageous to disperse these constituents in fractions of the liquid acrylate compounds prior to adding them to the coating agent. The abovementioned inorganic pigments, if they are employed solely in the second composition in step iv) of the process according to the invention, can, in contrast to the plasticizers, increase the hardness of the coating (B).

Moreover, micronized fillers such as e.g. silica, aluminum oxide, titanium dioxide or barium sulfate can also be employed. They are white, colorless or opaque/transparent and are employed in finely dispersed form. Depending on the quantity and type they can likewise influence the hardness of the coatings (A) and (B).

The quantity of auxiliaries (including the photo initiators) should preferably be between 0.1 to 20 wt. %, particularly preferably 0.5 to 15 wt. %.

Furthermore, in a preferred embodiment, antibacterial or biocidal compounds can also be comprised in the coating agent. They concern for example organic substances, such as bioguanidines, substituted Benzalkonium halides, alkyl polyvinylpyridines, betaines or inorganic compounds, such as silver salts or finely dispersed silver particles in the particle size range of a few nm. The amount should be 0.1 to 5 wt. %. This depends on the activity of the added substance. These compounds are blended into the coating agent and are not destroyed during the crosslinking reaction. They afford long-term antibacterially-active surfaces.

The constituents of the coating agents according to the invention can be mixed according to known methods. In this regard it can be necessary to dissolve its solid constituents in low viscosity constituents or e.g. to disperse the pigments. In order to ensure storage stability, it can be advantageous for specific reactive constituents to make a premix in low viscosity constituents and to limit any possible reaction before adding them to the coating agent.

Consequently, preferred first compositions for step ii) of the process according to the invention comprise the following constituents:
a) 40 to 90 wt. %, particularly preferably 45 to 85 wt. %, of at least one oligomeric linear or branched epoxy-, polyester-, polyether- and/or polyurethane-(meth)acrylate,
b) 5 to 60 wt. %, particularly preferably 10 to 55 wt. % of at least one monofunctional liquid (meth)acrylate compound or di-, tri-, or poly(meth)acrylate compound,
c) 0.1 to 20 wt. % of at least one acid group-containing (meth)acrylate compound, as well as
d) a total of 0.1 to 20 wt. % of photo initiators as well as optionally auxiliaries from the paint industry selected from leveling agents, pigments, colorants, fillers and/or light stabilizers, and
e) a total of 0.5 to 20 wt. %, particularly preferably 2 to 10 wt. % of internal or external plasticizers preferably selected from phthalates, glycerin fatty acid esters or liquid unsaturated low molecular weight compounds, which do not represent components a) or b).

In contrast, second compositions for step iv) of the process according to the invention preferably comprise the following constituents:
a) 40 to 90 wt. %, particularly preferably 45 to 85 wt. %, of at least one oligomeric linear or branched epoxy-, polyester-, polyether- and/or polyurethane-(meth)acrylate,
b) 5 to 60 wt. %, particularly preferably 10 to 55 wt. % of at least one monofunctional liquid (meth)acrylate compound or di-, tri-, or poly(meth)acrylate compound,
c) a total of 0.1 to 20 wt. % of photo initiators as well as optionally auxiliaries from the paint industry selected from leveling agents, pigments, colorants, fillers and/or light stabilizers, and
d) a total of 0 to 10 wt. %, particularly preferably 0.5 to 5 wt. % of internal and/or external plasticizers, preferably selected from phthalates, glycerin fatty acid esters or liquid unsaturated low molecular weight compounds, which do not represent components a) or b).

In order to ensure in the process according to the invention that the hardness of coating (B) exceeds that of the coating (A), the second composition applied in step iv) of the process according to the invention preferably comprises a lower weight fraction of each of the respective same internal and/or external plasticizers as in the first composition applied in step ii), particularly preferably there are no internal and/or external plasticizers selected from phthalates, glycerin fatty acid esters or liquid unsaturated low molecular weight compounds, which do not represent components a) or b).

The hardness of the layer can preferably also be appropriately varied through the type of the components a) and b). Thus, compositions comprising acrylate-modified polyester resins according to component a) yield rather hard coatings, whereas acrylate-modified polyurethane resins yield softer coatings. In so far as they possess long chain alkyl groups for example, the monofunctional liquid (meth)acrylate or di, tri or poly(meth)acrylate compounds according to component b) can assume the function of an internal plasticizer in radiation curing compositions of the process according to the invention.

In steps ii) and iv) of the process according to the invention, the arrangement made of wire-shaped individual elements can be provided with the respective radiation curing composition using the known application methods. If arrangements of shaped wire-shaped individual elements are coated, spray systems that are commonly used in the paint industry are suitable such as e.g. airless, air-assisted or electrostatically assisted spray methods, or also application by manual brushing. In a particularly preferred manner the respective composition is applied onto a ribbon of wires surface by flow coating/squeezing out, spraying/squeezing out, by suitable wiping or roller applications.

The viscosity of the respective compositions should not exceed a specific value when applying the coatings (A) and (B) in the steps ii) and iv). Fundamentally, preferred viscosities of the compositions are between 30 000 and 100 000 mPas; however, the viscosity of the first composition should be preferably lower than 45 000 mPas, while that of the second composition is preferably lower than 60 000 mPas.

Higher viscosities impede a uniform coating of the compositions in steps ii) and iv) of the process according to the invention and hence the formation of a closed acrylate coating. However, higher viscosity compositions can also be processed by moderately heating the arrangement of wire-shaped individual elements, especially the ribbon of wires.

Both compositions can generally be applied in steps ii) and iv) at temperatures between 0 and 90° C., preferably between 15 and 70° C. The respective composition is then crosslinked by energetic radiation, such as for example UV radiation, electron beam radiation or γ-radiation. The electron beam should have an energy value between 150 and 350 keV. Crosslinking is preferably carried out with UV radiation, in particular with a wave length of 150 to 800 nm, particularly preferably between 200 and 450 nm. Suitable radiation sources are known to the person skilled in the art. The radiation intensity and irradiation time depend on the process conditions, e.g. distance from the radiation source or the relative movement of the source and substrate. However, in general the time is below 60 seconds, preferably between 0.001 and 30 seconds. The various machine settings can be determined by the person skilled in the art by simple adjustments.

In a particular process embodiment, the amount of oxygen can be reduced in the zone above the substrate to be crosslinked. In particular it should be less than 3000 ppm, preferably less than 1000 ppm. This can be accomplished, for example, by a partial or complete exchange of the surrounding air in the crosslinking zone with inert gases, e.g. with argon, nitrogen, CO2 or mixtures thereof. An advantage of this process embodiment is that the required concentration of photo initiator in the respective radiation crosslinking composition can be reduced.

Another embodiment of the process according to the invention includes the additional step, after the respective composition has been applied, of first applying a film that is penetrable by the energetic radiation, onto the arrangement being adhesively bonded. It is possible to provide three-dimensionally shaped arrangements with a film of this type, but it is preferred when the arrangement of the wire-shaped individual elements is present as a ribbon of wires. An automatic application process is preferably carried out. Here, for example the tear-resistant film can be reeled off a storage reel and applied bubble-free by means of a cylinder onto one or both sides of the surface of the ribbon of wires. After this process step the respective composition under the film is crosslinked by radiation. An advantage of this process is that the curing takes place under the film in inert conditions, i.e. in particular in the absence of oxygen.

The film consists for example of polyethylene, polypropylene, PET or mixtures thereof. It is colored or preferably transparent. The film should not react with the respective composition. It is tear-resistant, such that in a later process step it can be peeled away and removed from the surface of the ribbon of wires. The end user can also do this, such that the film can serve as a protection for the object in the course of further processing and/or transport.

Overall, the process according to the invention is a two-step process, wherein the individual sequential steps are designed with identical process technology and each involve the application of the first or second composition and of their radiation curing, preferably by UV radiation. In addition, a two-step process following the type of a linear band process is preferred, in which wires, similarly to a loom, are unwound from bobbins and guided over combs, aligned and arranged one beside the other. For thicker wires, guide pulleys can also be used. Compression rollers are also possible; they flatten out the wires and thus turn them into the typical cross sectional shape of staples. In the first step according to step ii) of the process of the invention, the first composition is simultaneously applied underneath and on top with a slot applicator (similar to a case knife system) and then cured under UV radiation. In the subsequent second step of the preferred linear band process, the second composition is applied in a manner defined according to step iv) of the process according to the invention onto the first coated ribbon of wires and then likewise cured under UV radiation.

The advantage associated with the process according to the invention in the linear band process consists in the rapid throughput of the ribbon of wires and is made possible by the short curing time of the acrylate-based compositions under UV radiation.

In another aspect, the present invention likewise includes the arrangement of the adhesively bonded wire-shaped individual elements in the form of the ribbon of wires or of the correspondingly shaped ribbon of wires for use as a magazine of fastening elements. An arrangement of a plurality of wire-shaped individual elements is therefore also inventive, wherein each individual element has essentially the same shape, in which arrangement two adjacent individual elements are each connected to one another through a cohesive bond that is shaped such that a predetermined breakage area is formed for separating the individual elements from one another, wherein the cohesive bond between two adjacent individual elements consists, at least in the region of the predetermined breakage area, of a two-layer system formed from two polymer coatings (A) and (B) of different hardness, wherein on the predetermined breakage area the inner coating (A) that exclusively has contact surfaces with the adjacent individual elements and with the external coating (B) always represents the softer polymer coating, wherein both polymer coatings (A) and (B) represent coatings based on acrylate resins.

In this case it is preferred that the cohesive connection of the wire-shaped individual elements completely surrounds the plurality of wire-shaped individual elements and consists of a two-layer system formed from two polymer coatings (A) and (B) of differing hardness, wherein the inner coating (A) that has exclusively contact surfaces with adjacent individual elements and with the external coating (B), always represents the softer polymer coating.

This preferred embodiment corresponds to the cohesive arrangement of wire-shaped individual elements as is produced by the preferred linear band process in the two-step process.

In particular, the arrangement of the wire-shaped individual elements that either have a longitudinal axis or are shaped in such a way that they define a plane preferably results in that the predetermined breakage areas are arranged either parallel to the longitudinal axis or parallel to the plane defined by the individual element. The preferred linear band process provides the arrangement of wire-shaped individual elements parallel to their longitudinal axis, such that there results an endless ribbon of wires of adhesively bonded individual wires.

In particular then, a cohesive connection of the wire-shaped individual elements based on a two-layer system of acrylate resins provides an adequate flexibility and stability of the arrangement that is made of a plurality of wire-shaped individual elements if the maximum length in the cross section or the diameter of the wire-shaped individual elements is preferably not more than 5 mm, particularly preferably not more than 2 mm. However, the maximum length in the cross section or the diameter of the wire-shaped individual elements should preferably be at least 0.2 mm.

The surface-related coating weight of the two-layer system and hence of both coatings (A) and (B) for an adequate cohesive connection of the adjacent wire-shaped individual elements is preferably at least 5 g/m2. However, in order to maintain material usage as low as possible, the coating weight should preferably not exceed 50 g/m2, particularly preferably 20 g/m2. For coating ribbon of wires, this corresponds to about 0.5 to 3 g, preferably up to 1.5 g, of the two-layer system for 100 g wire having a diameter of 0.9 mm.

Furthermore, the wire-shaped individual elements of the arrangement according to the invention are preferably metallic and in addition are preferably produced from steel wire or galvanized steel wire.

The inventive arrangement of the plurality of wire-shaped individual elements is preferably an adhesively bonded ribbon of wires or a shaped adhesively bonded ribbon of wires, particularly preferably a U-shaped adhesively bonded ribbon of wires, especially a stack of staples.

The invention claimed is:

1. An arrangement of a plurality of wire-shaped individual elements, wherein each individual element has essentially the same dimensional shape, in which arrangement two adjacent individual elements are each connected to one another through a cohesive bond that completely surrounds the plurality of wire-shaped individual elements and is shaped such that a predetermined breakage area is formed for separating the individual elements from one another, wherein the cohesive bond between two adjacent individual elements consists, at least in the region of the predetermined breakage area, of a two-layer system formed from two polymer coatings (A) and (B) of different hardness, wherein on the predetermined breakage area the inner coating (A) clusively has contact surfaces with the adjacent individual elements and with the external coating (B) and always represents the softer polymer coating, wherein (A) is prepared from
a) 40 to 90 wt. % of at least one oligomeric linear or branched epoxy-, polyester-, polyether- and/or polyurethane-(meth)acrylate,
b) 5 to 60 wt. % of at least one monofunctional liquid (meth)acrylate compound or di-, tri-, or poly(meth)acrylate compound,
c) 0.1 to 20 wt. % of at least one acid group-containing (meth)acrylate compound,
d) 0.1 to 20 wt. % of photoinitiators,
e) 0.5 to 20 wt. % of plasticizers that do not represent components a) or b) and are selected from the group consisting of phthalates, glycerine fatty acid esters, and liquid unsaturated low molecular weight compounds, and wherein (B) is prepared from
a) 40 to 90 wt. % of at least one oligomeric linear or branched epoxy-, polyester-, polyether- and/or polyurethane-(meth)acrylate,
b) 5 to 60 wt. % of at least one monofunctional liquid (meth)acrylate compound or di-, tri-, or poly(meth)acrylate compound,
c) 0.1 to 20 wt. % of photoinitiators,
d) 0 to 10 wt. % of plasticizers that do not represent components a) or b) and are selected from the group consisting of phthalates, glycerine fatty acid esters, and liquid unsaturated low molecular weight compounds.

2. The arrangement according to claim 1, wherein each wire-shaped individual element has a longitudinal axis or is shaped in such a way that it defines a plane that lies parallel to the predetermined breakage area, wherein the individual elements are arranged either parallel to the longitudinal axis or parallel to the plane defined by the individual element.

3. The arrangement according to claim 1, wherein the wire-shaped individual elements possess a wire diameter of at least 0.2 mm, but not more 5 mm.

4. The arrangement according to claim 1, wherein the total coating weight of the two polymer coatings (A) and (B) is at least 5 g/ m$^2$ but not more than 50 g/m$^2$.

5. The arrangement according to claim 1, wherein the wire-shaped individual elements are produced from steel wire or galvanized steel wire.

* * * * *